S. MILNE.
EXPANDING ROPE PULLEY.
APPLICATION FILED AUG. 29, 1911.

1,180,867. Patented Apr. 25, 1916.

Witnesses:— Inventor:
John C. Sanders Samuel Milne
Dudley B. Howard By his Attorney:

UNITED STATES PATENT OFFICE.

SAMUEL MILNE, OF EDINBURGH, SCOTLAND.

EXPANDING ROPE-PULLEY.

1,180,867.  Specification of Letters Patent.  Patented Apr. 25, 1916.

Application filed August 29, 1911. Serial No. 646,655.

*To all whom it may concern:*

Be it known that I, SAMUEL MILNE, a subject of the King of Great Britain and Ireland, and resident of Edinburgh, Scotland, have invented certain new and useful Improvements in Expanding Rope-Pulleys, of which the following is a specification.

This invention refers to and consists of improvements in expanding rope pulleys, the improvements being more particularly intended for application to the expanding rope pulleys used in paper making machines. With such machines it is desirable that the working diameters of the pulleys shall be capable of ready variation, and further, that the working diameters of the pulleys may be varied while the machines are running.

According to the invention and as applied to an expanding rope pulley comprising two or more main parts which collectively produce the groove, or grooves, for the ropes, and one of which is relatively fixed while the other, or others, are relatively adjustable, the improvements consist essentially in using a series of screws for adjusting the laterally movable part or parts toward and away from the relatively fixed part, the screws being arranged near to the rim of the pulley and thereby affording a very secure holding of the parts after each adjustment and preventing all springing of the parts as is usual when levers and similar devices are used.

The improvements also consist of means whereby the several screws may be independently or collectively adjusted either while the pulley is stationary or while it is in motion.

Figures 1, 2:
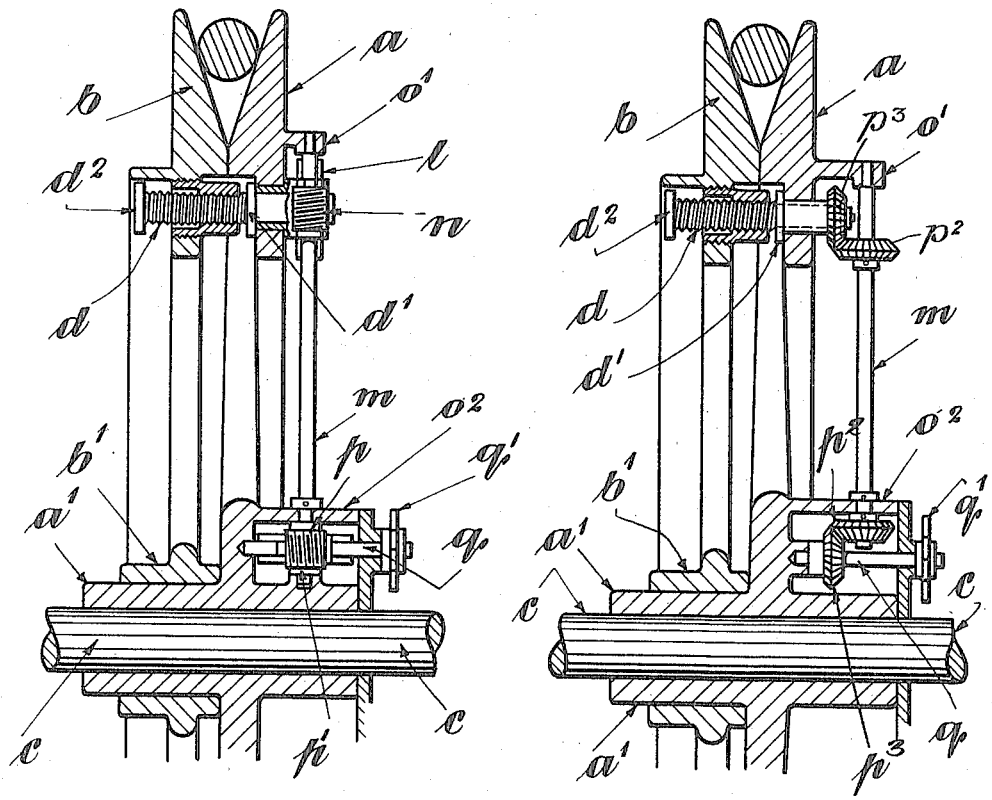
Figures 3, 4:
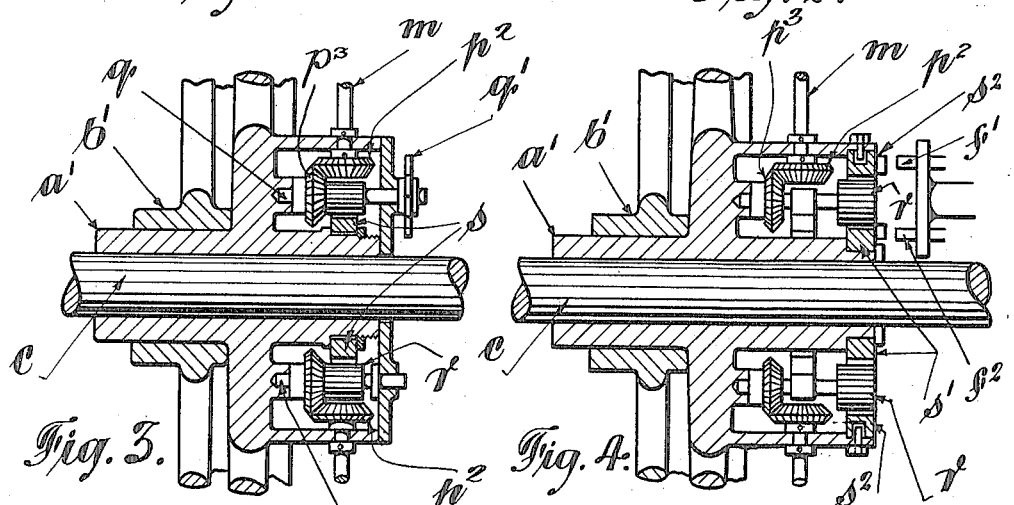

Upon the accompanying drawings, Figure 1 illustrates a transverse section of the pulley (in part). Fig. 2 illustrates a similar view to Fig. 1 but showing how bevel gearing may be substituted for the worm gearing. Figs. 3 and 4 illustrate further modifications of the gearing mechanism of the pulley enabling the spindles to be rotated collectively.

Referring to Fig. 1, the letters $a$, $b$, designate the two parts of the pulley, the part $a$ being provided with an elongated hub or boss $a'$ which fits and is keyed to the shaft $c$, and the part $b$ being provided with a hub $b'$ which slidably fits the boss $a'$. $d$ is one of the screws by which the two parts of the pulley are adjustably connected to each other. One part of the screw is plain and rotatably fits a hole in the part $a$ of the pulley near the rim, and the screw is held against endwise movement in the part $a$ by a flange or collar $d^1$ the other and screw-threaded part of the screw passes through a screw-threaded hole in the part $b$ of the pulley. With the two parts of the pulley lying against each other, as shown, and producing the largest working diameter, the screw projects beyond the side of the part $b$ for a distance equal to the distance it is desired to move the part $b$ away from the part $a$ to produce the smallest working diameter of pulley. The end of the screw is provided with a flange $d^2$ to prevent the part $b$ leaving the screw, or to prevent the rope passing below the bottom of the pulley groove. The number of screws used may vary according to the size of the pulley, but usually about six screws will be used in a four foot pulley.

It should now be seen that by adjusting (rotating) each screw the part $b$ of the pulley may be moved away from and back again toward the part $a$, thereby varying the working diameter of the pulley. It will also be seen that with the screws arranged in close proximity to the rim, there will be no springing apart of the rim portions of the pulley. In large pulleys in which the rope exerts a powerful force in driving (tending to separate the parts of the rim) the arrangement of the screws near to the rim is of great importance.

The adjustment of the screws $d$ is effected from a point near the shaft $c$. To each of the screws $d$, as shown in Fig. 1, is applied a worm wheel $l$ and upon a spindle $m$ radiating from the shaft $c$ is a worm $n$ which meshes with the teeth of the worm wheel $l$.

The spindle $m$ is rotatably mounted in flanges $o^1$ and $o^2$, and upon that end of the spindle $m$ nearest the shaft is fixed a further worm wheel $p$ and upon a short spindle $q$ mounted parallel to the shaft $c$ is a further worm $p^1$ which meshes with the worm wheel $p$. Upon the spindle $q$ is also fixed a star wheel $q^1$. As the pulley rotates the gear mechanism before referred to rotates bodily with it. Therefore by advancing a fixed peg into the path of the teeth of the star wheel above or below the spindle $q$, the spindles $q$ and $m$ are rotated to right or left, the screws $d$ are rotated, and the part $b$ of the pulley is thereby adjusted relatively to the part $a$.

In Fig. 2, the arrangement therein shown only differs from the arrangement shown in Fig. 1, in that bevel wheels $p^2$, $p^3$ are used both at the outer end of the spindle $m$ and the shaft end.

In Fig. 3 a single star wheel $q^1$ is used and its movements are communicated to the several bevel wheels $p^2$ $p^3$ by means of pinions $r$, one on each spindle $q$, and an annular gear ring $s$, the teeth of this latter meshing with the teeth of all the pinions. By holding a relatively stationary peg in the path of the teeth of the star wheel above or below its axis, the star wheel $q^1$ is rotated to right or left, the several bevel wheels are rotated and the part $b$ of the pulley moved toward or away from the part $a$ by the screws $d$ (not shown).

In Fig. 4 two gear rings $s^1$, $s^2$ are used, and the star wheel is dispensed with, the pegs $f^1$, $f^2$ being designed to engage holes in, or lateral projections on, the rings and, by holding one or the other ring stationary, cause the pinions $r$ and bevel wheels $p^2$, $p^3$ to be rotated to right or left and, through them, the screws $d$ (not shown), the direction of rotation depending on which ring is held stationary.

The adjustable part of the pulley may be made with rigid arms and a boss sliding either on the shaft, or on the boss of the fixed part, but it may also be made with flexible arms to enable the necessary movement of the rim to be obtained, while the boss near the shaft may be fixed.

Suitable mechanism for indicating the position of the adjustable part of the pulley may be provided. The improved pulley may be coupled direct to the part of the paper machine to be driven, or it may be arranged to drive through reducing gear inclosed in a casing suitable for holding a lubricant, in which the gears would run.

What I claim is:—

In combination, an expanding rope pulley as used in paper making machines, composed of a relatively fixed part and a laterally movable part, a series of screws arranged at equal distances apart and near the rim of the pulley, and each screw having a plain part rotatably mounted in the relatively fixed part of the pulley and incapable of endwise movement, and each screw screwing through the laterally movable part of the pulley a gear wheel on each screw, a series of spindles, one for each screw, radiating from the hub of the pulley, a gear wheel at one end of each spindle engaging the gear wheel on the screw, and a gear wheel at the inner end of each spindle, a series of spindles, one for each screw, parallel with the longitudinal sides of the pulley hub, means for supporting such spindles, a gear wheel on each spindle meshing with the gear wheel on the inner end of one of the radiating spindles, and means whereby the said spindles and gear wheels may be rotated to right or left and the screws in the pulley be thereby caused to adjust the laterally movable part of the pulley, as set forth.

In witness whereof I have hereunto set my hand in the presence of two witnesses.

SAMUEL MILNE.

Witnesses:
JAMES WHITELAW,
GEORGE COBB.

Copies of this patent may be obtained for five cents each, by addressing the "Commissioner of Patents, Washington, D. C."